United States Patent
Nakamura

(10) Patent No.: US 7,577,003 B2
(45) Date of Patent: Aug. 18, 2009

(54) SWITCHING POWER SUPPLY

(75) Inventor: Masaru Nakamura, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 383 days.

(21) Appl. No.: 10/594,625

(22) PCT Filed: Feb. 14, 2005

(86) PCT No.: PCT/JP2005/002139

§ 371 (c)(1),
(2), (4) Date: Sep. 28, 2006

(87) PCT Pub. No.: WO2005/101630

PCT Pub. Date: Oct. 27, 2005

(65) Prior Publication Data

US 2007/0217234 A1    Sep. 20, 2007

(30) Foreign Application Priority Data

Mar. 30, 2004  (JP) .......................... P2004-100753

(51) Int. Cl.
*H02M 3/335* (2006.01)
*H02H 7/122* (2006.01)
(52) U.S. Cl. ................. 363/21.12; 363/56.01; 363/50; 363/52; 363/55
(58) Field of Classification Search ............. 363/21.01, 363/21.04, 21.07, 21.08, 21.12, 21.15, 21.16, 363/56.1, 50, 52, 55
See application file for complete search history.

(56) References Cited

U.S. PATENT DOCUMENTS

| 6,879,501 B2* | 4/2005 | Mori ................. 363/56.03 |
| 6,975,521 B1* | 12/2005 | Konno ................. 363/21.08 |
| 2007/0217234 A1 | 9/2007 | Nakamura | |

FOREIGN PATENT DOCUMENTS

| JP | 9 74748 | 3/1997 |
| JP | 2001 95139 | 4/2001 |
| JP | 2002 199715 | 7/2002 |
| JP | 2002 209339 | 7/2002 |
| JP | 2003 333843 | 11/2003 |

OTHER PUBLICATIONS

U.S. Appl. No. 12/212,285, filed Sep. 17, 2008, Nakamura.
U.S. Appl. No. 12/345,042, filed Dec. 29, 2008, Nakamura.

* cited by examiner

*Primary Examiner*—Thuy Vinh V Tran
*Assistant Examiner*—Matthew Grubb
(74) *Attorney, Agent, or Firm*—Oblon, Spivak, McClelland, Maier & Neustadt, P.C.

(57) ABSTRACT

A switching power source is capable of conducting constant-current drooping control on a load, increasing an energy conversion efficiency on a secondary side, and improving heat radiation performance. The switching power source detects whether or not an overcurrent exceeding a reference value V6 is passed to a switching element Q1, switches a first constant current I3 and a second constant current I4 smaller than the first constant current I3 from one to another according to a result of the overcurrent detection, directly superposes the first constant current I3 on a feedback voltage V3 at an input part, superposes the second constant current I4 on an output part where the feedback voltage is converted to have an impedance lower than that at the input part, and controls the ON-period of a pulse signal supplied to the switching element Q1 according to a resultant feedback voltage, thereby achieving constant-current drooping control on a load 29.

7 Claims, 9 Drawing Sheets

SWITCHING POWER SUPPLY

TECHNICAL FIELD

The present invention relates to a switching power source capable of carrying out constant-current drooping control for a load.

BACKGROUND TECHNOLOGY

1. Related Art

As a switching power source according to a related art, FIG. 1 shows a battery charger apparatus.

To charge a load 29 that is a battery such as a lithium battery with a constant current, the battery charger apparatus adds a current detection circuit 9 to a secondary side of a conventional power source circuit and carries out constant-current drooping control for an output voltage V1 as shown in FIG. 2.

When an output current I1 gradually increases from 0 A (point Pa) in FIG. 2, a feedback voltage V3 is controlled to increase, so that the ON-period of a switching element Q1 made of a power MOSFET may extend. When the output current I1 further increases, a drop voltage at a current detection resistor R4 on the secondary side increases. If the voltage drop reaches at about 0.7 V, a transistor Q3 for detecting a secondary-side current turns on to increase a forward current of a photo coupler PD. As a result, the feedback terminal voltage V3 decreases to limit the ON-period of the switching element Q1. Consequently, the output voltage V1 shows a constant-current drooping characteristic (Pb to Pc).

2. Related Art

A technique of conducting constant-current drooping control on a primary side and omitting a current detection circuit on a secondary side is reported in Japanese Unexamined Patent Application Publication No. JP9-74748.

The technique of the Japanese Unexamined Patent Application Publication No. JP9-74748 employs, as shown in FIG. 3, a characteristic that a power source voltage V2 on an auxiliary side drops in proportion to the drooping of an output voltage V1 at the time of overload. At this time, the technique decreases a reference voltage V6 for a comparator 18, which is used to detect an overcurrent, to limit the maximum ON-width of a switching element Q1. Unlike the related art 1, the related art 2 employs no current detection circuit on a secondary side when realizing a constant-current drooping characteristic for the output voltage V1. For this, the related art 2 must arrange a constant-current source 19a and a resistor R11 in a semiconductor integrated circuit 8z and must apply a divided voltage of the power source voltage V2 to a terminal 101.

According to the related art 2, a set value for the power source voltage V2 is dependent on the purpose of use, and therefore, the semiconductor integrated circuit 8z must have the terminal 101 and voltage detection resistors R9 and R10, to adjust the ratio of change of the reference voltage V6.

In a semiconductor integrated circuit having a power switching element and a control circuit packed in a package such as a DIP8 having no radiation fins, an ability of heat radiation is an important factor. To reduce thermal resistance, the area of a base frame of the power switching element must be expanded as large as possible, or a part of the base frame must be extended outside the package to serve as a heat radiation terminal.

DISCLOSURE OF INVENTION

The battery charger apparatus of the related art 1 causes a loss at the current detection resistor R4 on the secondary side, to deteriorate an energy conversion efficiency. To improve a temperature characteristic and detection accuracy, the current detection circuit 9 must have an operational amplifier and a constant voltage source such as a 3-terminal regulator, to hardly reduce the cost.

In connection with the related art 2, the Japanese Unexamined Patent Application Publication No. JP9-74748 directs to a need of reducing the number of heat radiation terminals and providing an exclusive terminal for detecting a power source voltage. Accordingly, the related art 2 causes a side effect of deteriorating a package's heat radiation ability and reducing output power.

The present invention has been made in consideration of these problems. An object of the present invention is to provide a switching power source capable of carrying out constant-current drooping control for a load and improving an energy conversion efficiency on a secondary side and a heat radiation ability.

To achieve the object, an invention stipulated in claim 1 is a switching power source having a switching element connected in series with a primary winding of a transformer connected to a DC power source; a first rectifying/smoothing circuit to rectify and smooth AC power induced by a secondary winding of the transformer; a second rectifying/smoothing circuit to rectify and smooth AC power induced by an auxiliary winding of the transformer and provide an internal power source; an output detection circuit to detect an output voltage that is provided from the first rectifying/smoothing circuit to a load; and a control circuit to control the ON-period of a pulse signal supplied to the switching element according to a feedback voltage from the output detection circuit. The control circuit has an overcurrent detection circuit to detect whether or not an overcurrent exceeding a predetermined reference value is passed to the switching element; and a constant-current drooping control circuit to select one of a first constant current and a second constant current smaller than the first constant current according to an overcurrent detection result from the overcurrent detection circuit and superpose the selected current on the feedback voltage from the output detection circuit. The control circuit controls the ON-period of the pulse signal supplied to the switching element according to a resultant feedback voltage provided by the feedback voltage superpose circuit.

To achieve the object, an invention stipulated in claim 2 is a switching power source having a switching element connected in series with a primary winding of a transformer connected to a DC power source; a first rectifying/smoothing circuit to rectify and smooth AC power induced by a secondary winding of the transformer; a second rectifying/smoothing circuit to rectify and smooth AC power induced by an auxiliary winding of the transformer and provide an internal power source; a first output detection circuit to detect an output voltage that is provided from the first rectifying/smoothing circuit to a load; a second output detection circuit to detect an output voltage provided from the second rectifying/smoothing circuit; and a control circuit to control the ON-period of a pulse signal supplied to the switching element according to a feedback voltage from the first and second output detection circuits. The control circuit has an overcurrent detection circuit to detect whether or not an overcurrent exceeding a predetermined reference value is passed to the switching element; a constant-current drooping control circuit to select one of a first constant current and a second constant current smaller than the first constant current according to an overcurrent detection result from the overcurrent detection circuit, output the selected current, and carry out constant-current drooping control; and a feedback voltage superpose circuit to superpose the first constant current provided by the constant-current drooping control circuit on the feedback voltage provided by the first and second output detection circuits and superpose the second constant current on an output from a part where an impedance conversion is carried out on the feedback voltage. The control circuit controls the ON-period of the pulse signal supplied to the switching element according to a resultant feedback voltage provided by the feedback voltage superpose circuit.

To achieve the object, an invention stipulated in claim 3 is a switching power source having a switching element connected in series with a primary winding of a transformer connected to a DC power source; a first rectifying/smoothing circuit to rectify and smooth AC power induced by a secondary winding of the transformer; a second rectifying/smoothing circuit to rectify and smooth AC power induced by an auxiliary winding of the transformer and provide an internal power source; a first output detection circuit to detect an output voltage that is provided from the first rectifying/smoothing circuit to a load; a second output detection circuit to detect an output voltage provided from the second rectifying/smoothing circuit; and a control circuit to control the ON-period of a pulse signal supplied to the switching element according to a feedback voltage from the first and second output detection circuits. The control circuit has a feedback voltage detection circuit to detect whether or not an overload state is present according to the feedback voltage from the output detection circuits; a constant-current drooping control circuit to switch a first constant current and a second constant current smaller than the first constant current from one to another according to an overload detection result from the feedback voltage detection circuit and carry out constant-current drooping control; and a feedback voltage superpose circuit to superpose the first constant current provided by the constant-current drooping control circuit on the feedback voltage provided by the first and second output detection circuits and superpose the second constant current on an output from a part where an impedance conversion is carried out on the feedback voltage. The control circuit controls the ON-period of the pulse signal supplied to the switching element according to a resultant feedback voltage provided by the feedback voltage superpose circuit.

To achieve the object, an invention stipulated in claim 4 is a switching power source having a switching element connected in series with a primary winding of a transformer connected to a DC power source; a first rectifying/smoothing circuit to rectify and smooth AC power induced by a secondary winding of the transformer; a second rectifying/smoothing circuit to rectify and smooth AC power induced by an auxiliary winding of the transformer and provide an internal power source; a first output detection circuit to detect an output voltage that is provided from the first rectifying/smoothing circuit to a load; a second output detection circuit to detect an output voltage provided from the second rectifying/smoothing circuit; and a control circuit to control the ON-period of a pulse signal supplied to the switching element according to a feedback voltage from the first and second output detection circuits. The control circuit has an overcurrent detection circuit to detect whether or not an overcurrent exceeding a predetermined reference value is passed to the switching element; a constant-current drooping control circuit to switch a first constant current to second and third constant currents that are each smaller than the first constant current, or in the other way according to an overcurrent detection result from the overcurrent detection circuit and carry out constant-current drooping control; and a constant-current superpose circuit to superpose the first and second constant currents provided by the constant-current drooping control circuit on the feedback voltage provided by the first and second output detection circuits and superpose the third constant current on an output part of an impedance element connected in series between impedance conversion parts. The control circuit controls the ON-period of the pulse signal supplied to the switching element according to a resultant feedback voltage provided by the feedback voltage superpose circuit.

To achieve the object, an invention stipulated in claim 5 allows the overcurrent detection circuit to employ each of the feedback voltage provided by the feedback voltage superpose circuit and a second reference voltage as the predetermined reference value.

To achieve the object, an invention stipulated in claim 6 allows the constant-current drooping control circuit to switch the second constant current to the first constant current if a voltage divided value of the power source voltage obtained by rectifying and smoothing the AC voltage induced by the auxiliary winding of the transformer exceeds the feedback voltage provided by the first and second output detection circuits.

To achieve the object, an invention stipulated in claim 7 allows the constant-current drooping control circuit to switch the second and third constant currents to the first constant current if a voltage divided value of the power source voltage obtained by rectifying and smoothing the AC voltage induced by the auxiliary winding of the transformer exceeds the feedback voltage provided by the output detection circuits.

DESCRIPTION OF THE PREFERRED EMBODIMENT

The best modes of implementation of the present invention will be explained in detail with reference to the drawings.

First Embodiment

Figure 1:
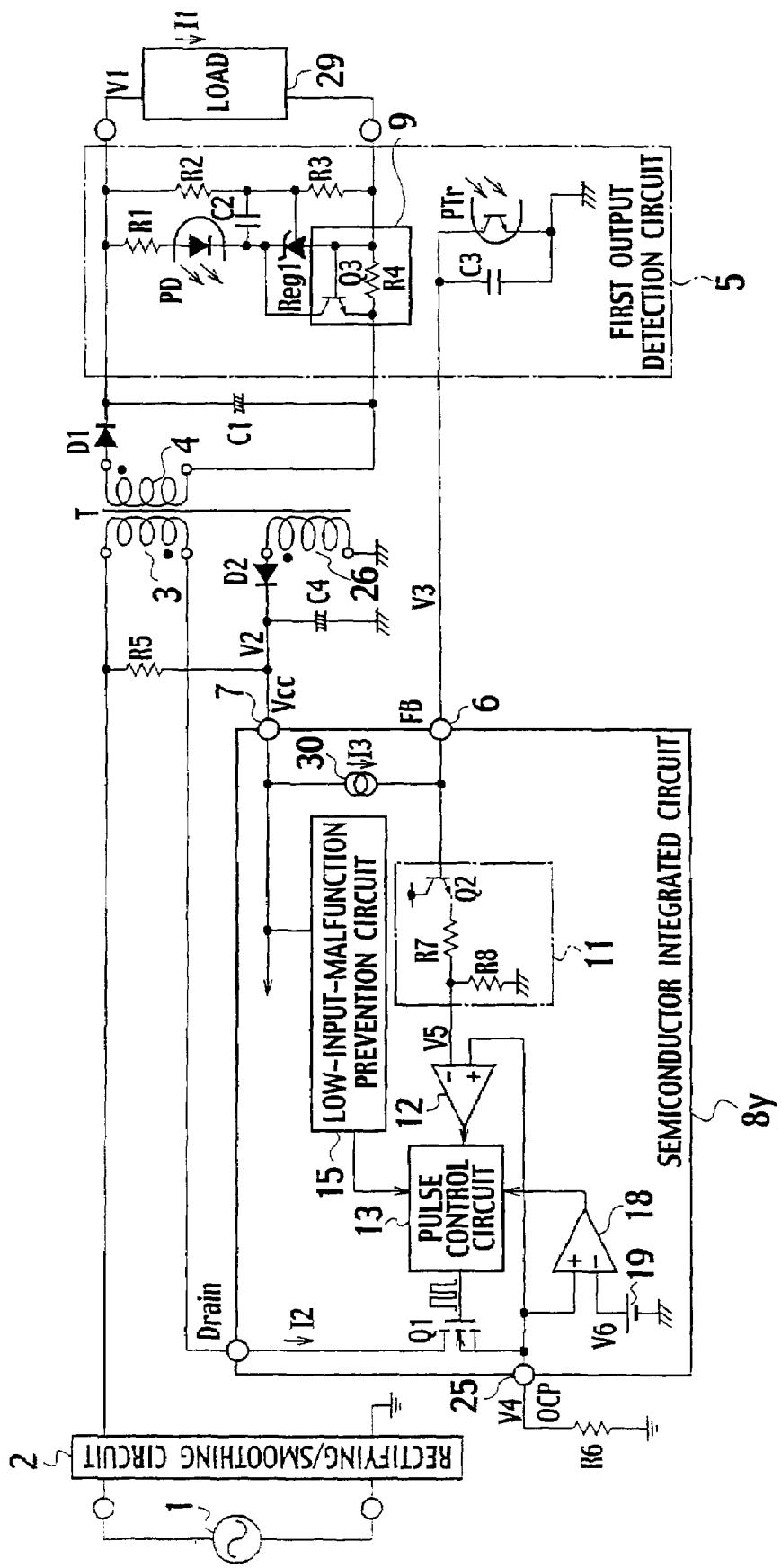
FIG. 1 is a view showing a battery charger apparatus according to the related art 1.
Figure 2:
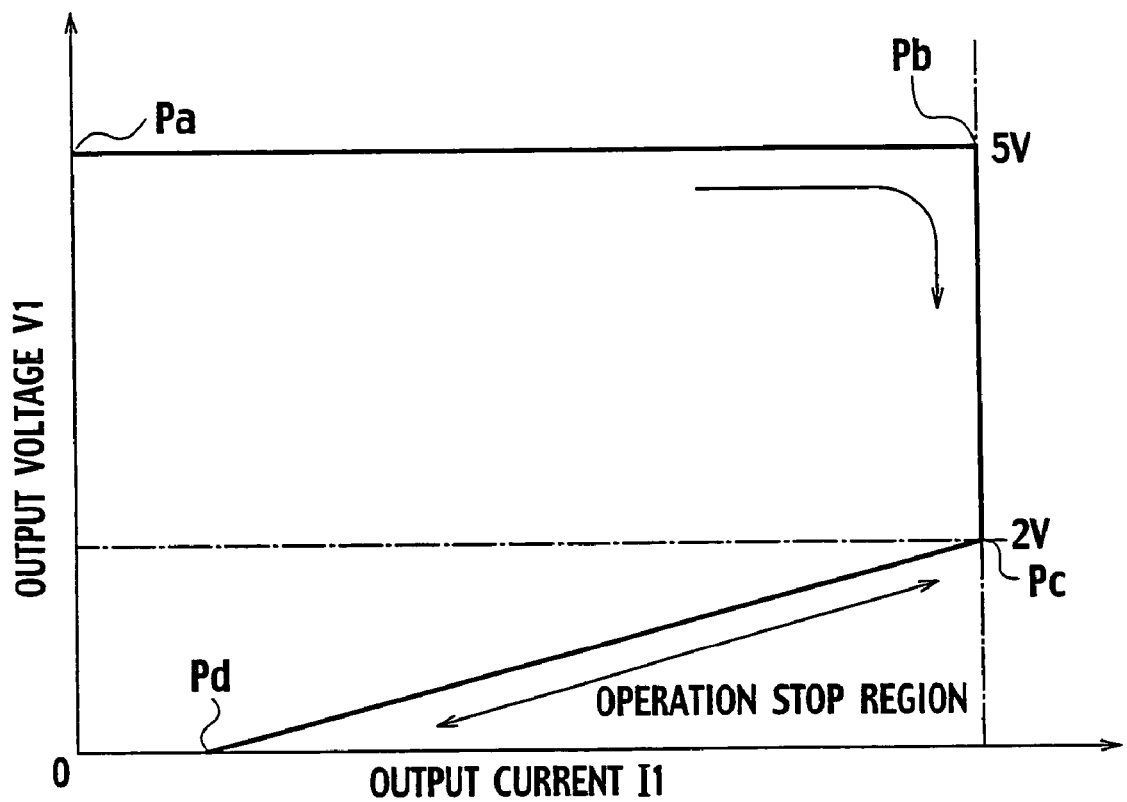
FIG. 2 is a graph showing a relationship between output current and output voltage according to the related art 1.
Figure 3:
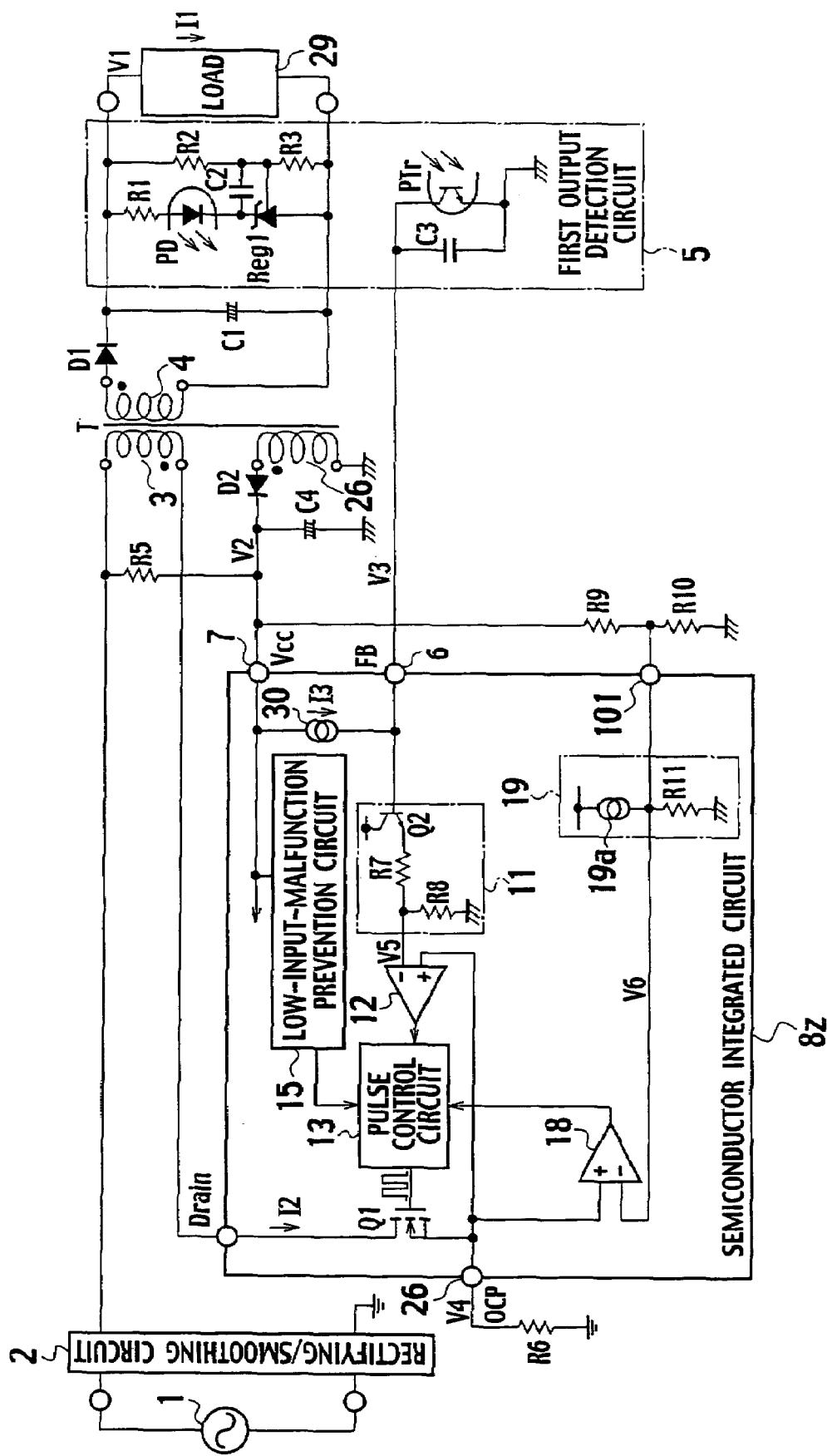
FIG. 3 is a view showing a switching power source according to the related art 2.
Figure 4:
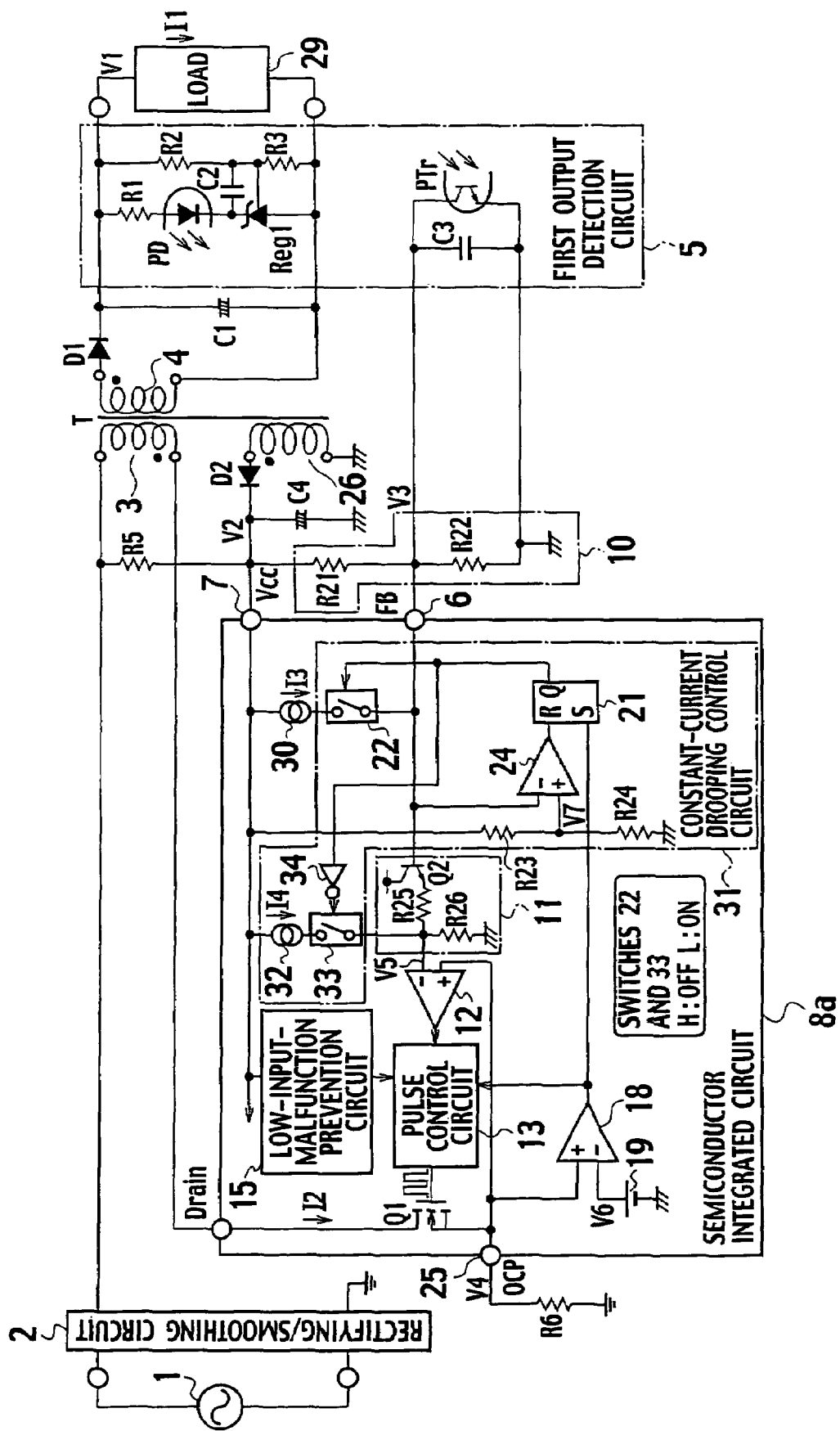
FIG. 4 is a view showing a switching power source according to a first embodiment of the present invention.

FIG. 4 is a view showing the structure of a switching power source according to the first embodiment of the present invention.

An AC power source 1 is connected to a rectifying/smoothing circuit 2. An output end of the rectifying/smoothing circuit 2 is connected to an end of a primary winding 3 of a transformer T.

The other end of the primary winding 3 of the transformer T is connected to a drain of a switching element Q1. A source of the element Q1 is connected through a drain current detection resistor R6 to a ground side of the rectifying/smoothing circuit 2.

The switching element Q1 is turned on/off by a semiconductor integrated circuit 8a to be explained later, to carry out a switching operation, so that electromagnetic energy accumulated in the primary winding 3 of the transformer T is successively discharged to a secondary winding 4. The discharged energy is half-wave-rectified through a diode D1 connected to an end of the secondary winding 4, is smoothed by a capacitor C1, and is passed through a first output detection circuit 5 to a load 29. The other end of the secondary winding 4 is connected to the load 29 that is an output. A collector of a phototransistor PTr is connected to a feedback terminal of the semiconductor integrated circuit 8a.

If the load is light, an output voltage divided by R2 and R3 will be higher than a reference voltage of a shunt regulator Reg1. In response to an error signal of this, the output detection circuit 5 provides a low-level output. As a result, a light emitting diode PD of a photocoupler emits light to output a feedback signal to the phototransistor PTr that is integral with the light emitting diode PD. Between the collector and emitter of the phototransistor PTr, a phase correcting capacitor C3 is connected. The collector of the phototransistor PTr is connected to the feedback terminal of the semiconductor integrated circuit 8a.

The semiconductor integrated circuit 8a shown in FIG. 4 is provided with an external resistor R21 between a Vcc terminal 7 and the feedback FB terminal 6. A voltage Vcc is half-wave-rectified through a diode D2 connected to an end of an auxiliary winding 26 of the transformer T, is smoothed with a capacitor C4, and is supplied to the Vcc terminal 7. The Vcc terminal 7 is commonly connected through a starting resistor R5 to an end of the rectifying/smoothing circuit 2 and an end of the primary winding 3 of the transformer T. The feedback FB terminal 6 of the semiconductor integrated circuit 8a is connected to a resistor R22. With the resistors R21 and R22, the voltage Vcc is converted into a feedback signal FB. The resistors R21 and R22 also function to divide a voltage V2 and supply the divided voltage to the FB terminal. Accordingly, the resistors R21 and R22 form a second output detection circuit 10.

The semiconductor integrated circuit 8a arranged in the switching power source of the first embodiment has, as shown in FIG. 4, a constant-current drooping control circuit 31, a feedback voltage superpose circuit 11, a feedback comparator 12, a pulse control circuit 13, a low-input-malfunction prevention circuit 15, an overcurrent detection comparator 18, and a reference voltage 19.

The Vcc terminal to which the power source voltage V2 is supplied is connected to an end of a constant current source 30, a resistor R23, an end of a constant current source 32, an end of the low-input-malfunction prevention circuit 15, and a collector of an impedance conversion element Q2. The feedback FB terminal 6 to which the feedback voltage V3 is supplied is connected to an end of a switch 22, an input terminal in negative polarity (−) of a comparator 24, and a base of the impedance conversion element Q2. A drain terminal to which an end of the primary winding 3 of the transformer T is connected to the drain of the switching element Q1. The drain current detection resistor R6 is connected to an OCP terminal, which is connected to the source of the switching element Q1, a positive polar input terminal (+) of the overcurrent detection comparator 18, and a positive polar input terminal (+) of the feedback comparator 12.

An input terminal in negative polarity (−) of the overcurrent detection comparator 18 is connected to the reference voltage 19, and an output terminal thereof is connected to the pulse control circuit 13 and a set terminal of a flip-flop 21 of the constant-current drooping control circuit 31. If a source voltage V4 that is a terminal voltage produced at the resistor R6 by a sawtooth drain current I2 exceeds a reference voltage V6, the comparator 18 provides a high-level output, thereby serving as an overcurrent detection circuit that detects whether or not a current passing through the switching element Q1 is higher than a given reference value.

In the constant-current drooping control circuit 31, the constant current source 30 connected to the Vcc terminal is connected to the switch 22. A constant current I3 provided by the constant current source 30 must have a sufficiently large value to raise the feedback voltage V3 close to the power source voltage V2.

A positive polar input terminal (+) of the comparator 24 receives a voltage V7 divided from the power source voltage V2 by the resistors R23 and R24, and a negative polar input terminal (−) thereof receives the feedback voltage V3. An output terminal of the comparator 24 is connected to a reset terminal of the flip-flop 21.

An output terminal Q of the flip-flop 21 is connected to the switch 22 for turning on/off the constant current and to an inverter 34. The inverter 34 is connected to a switch 33. If a Q-output signal of the flip-flop 21 is high, the switch 22 is in an open state and the switch 33 is in a short state. When the Q-output signal of the flip-flop 21 is low, the switch 22 is in a short state and the switch 33 is in an open state.

When the switch 22 is in an open state, the feedback voltage V3 is equal to the feedback signal superposed on the voltage divided from the power source voltage V2 by the resistors R21 and R22.

An emitter of the impedance conversion element Q2 that forms the feedback voltage attenuator 11 is connected through resistors R25 and R26 to the ground. A node between the resistors R25 and R26 is connected to an end of the switch 33 and a negative polar input terminal (−) of the comparator 12. When the switch 33 is in an open state, the feedback voltage V3 supplied to the base of the impedance conversion element Q2 is dropped by 0.7 V and appears at the emitter thereof. This voltage is divided by the resistors R25 and R26, and the divided voltage is supplied as a voltage V5 to the negative polar input terminal (−) of the comparator 12. An output terminal of the comparator 12 is connected to the pulse control circuit 13.

An output signal from the comparator 12 becomes high when the source voltage V4 becomes larger than the voltage V5 and becomes low when the voltage V5 becomes larger than the source voltage V4.

An output terminal of the low-input-malfunction prevention circuit 15 is connected to the pulse control circuit 13. When the power source voltage V2 decreases, the low-input-malfunction prevention circuit 15 provides the pulse control circuit 13 with a signal to stop the pulse control circuit 13, to thereby prevent a malfunction of the pulse control circuit 13 when the power source voltage V2 becomes low.

The pulse control circuit 13 provides the gate of the switching element Q1 with a PWM pulse signal whose ON-period varies in response to a control signal from the output terminal of the comparator 12. In response to a high-level current limit signal from the overcurrent detection comparator 18, the pulse control circuit 13 achieves a current limitation to provide a low-level control signal to the gate of the switching element Q1.

Operation of the switching power source according to the first embodiment will be explained with reference to FIGS. 4 to 7.

(1) General Operation of Switching Power Source Under Light Load Condition

When the AC power source 1 is started, the rectifying/smoothing circuit 2 passes a DC current through the starting resistor R5 to the Vcc terminal of the semiconductor integrated circuit 8a, to activate the respective parts of the semiconductor integrated circuit 8a.

At this time, the switching element Q1 is in an OFF state and the source voltage V4 is grounded through the resistor R6. Accordingly, the source voltage V4 is 0 V, and the comparator 18 provides a low-level output voltage. The feedback voltage V5 shows a value obtained by dividing the voltage of the rectifying/smoothing circuit 2 by the resistors R21 and R22. The voltage V7 shows a value obtained by dividing the same by the resistors R23 and R24.

At this time, the resistors R21 and R22 and the resistors R23 and R24 are designed in such a manner that the feedback voltage V3 and the voltage V7 supplied to the comparator 24 has a magnitude relationship of (feedback voltage V3)<(voltage V7). Consequently, the comparator 24 provides the R-terminal of the flip-flop 21 with a high-level reset signal. The Q-output terminal of the flip-flop 21, therefore, provides a low-level output. The switch 22 is in a short state, and a constant current I3 of about 300 µA is superposed on the feedback voltage V3. At this time, the switch 33 is in an open state.

At this time, the base of the impedance conversion element Q2 receives a voltage divided from the DC voltage of the rectifying/smoothing circuit 2 by the starting resistor R5 and the resistors R21 and R22. Then, the voltage is dropped by 0.7 V and appears at the emitter of the impedance conversion element Q2. This emitter voltage is divided by the resistors R25 and R26, and the divided voltage is supplied to the negative polar input terminal (−) of the comparator 12. The output terminal of the comparator 12 provides the pulse control circuit 13 with a low-level output.

In response to the low-level control signal from the comparator 12, the pulse control circuit 13 provides the gate of the switching element Q1 with a high-level signal. As a result, the switching element Q1 changes from the OFF state to an ON state.

When the switching element Q1 changes to the ON state, the DC current from the rectifying/smoothing circuit 2 is passed through the primary winding 3 of the transformer T, the drain-source of the switching element Q1, and the drain current detection resistor R6 to the ground. As a result, a core of the transformer T accumulates electromagnetic energy.

At the same time, the drain current I2 of the switching element Q1 gradually increases to increase the terminal voltage of the resistor R6, thereby increasing the voltage V4. When the increasing voltage V4 exceeds the voltage V5, the output terminal of the comparator 12 changes from low to high and provides the pulse control circuit 13 with a high-level output.

In response to the high-level control signal from the comparator 12, the pulse control circuit 13 provides the gate of the switching element Q1 with a low-level signal. Then, the switching element Q1 changes from the ON state to an OFF state. The electromagnetic energy accumulated in the core of the transformer T induces power at the secondary winding 4.

The power is rectified through the diode D1, is smoothed with the capacitor C1, and is supplied to the load 29.

When the switching element Q1 changes from the ON state to the OFF state, the voltage V4 becomes 0 V so that the output terminal of the comparator 12 changes from high to low. In response to the low-level control signal, the pulse control circuit 13 provides the gate of the switching element Q1 with a high-level signal. Then, the switching element Q1 changes from the OFF state to an ON state. In this way, the capacitor C1 is charged to increase the output voltage.

If a voltage divided from the output voltage to the load 29 by the resistors R2 and R3 becomes higher than the reference voltage of the shunt regulator Reg1, the output detection circuit 5 provides a low-level output according to an error signal, to cause the light emitting diode PD of the photocoupler emit light to provide the phototransistor PTr with a feedback signal.

Receiving the feedback signal, the phototransistor PTr establishes a collector-emitter conductive state to drop the terminal voltage of the capacitor C3, i.e., the feedback voltage V3, thereby carrying out feedback control for the switching power source.

(2) Changing from Light Load Condition to Heavy Load Condition

Figure 5:
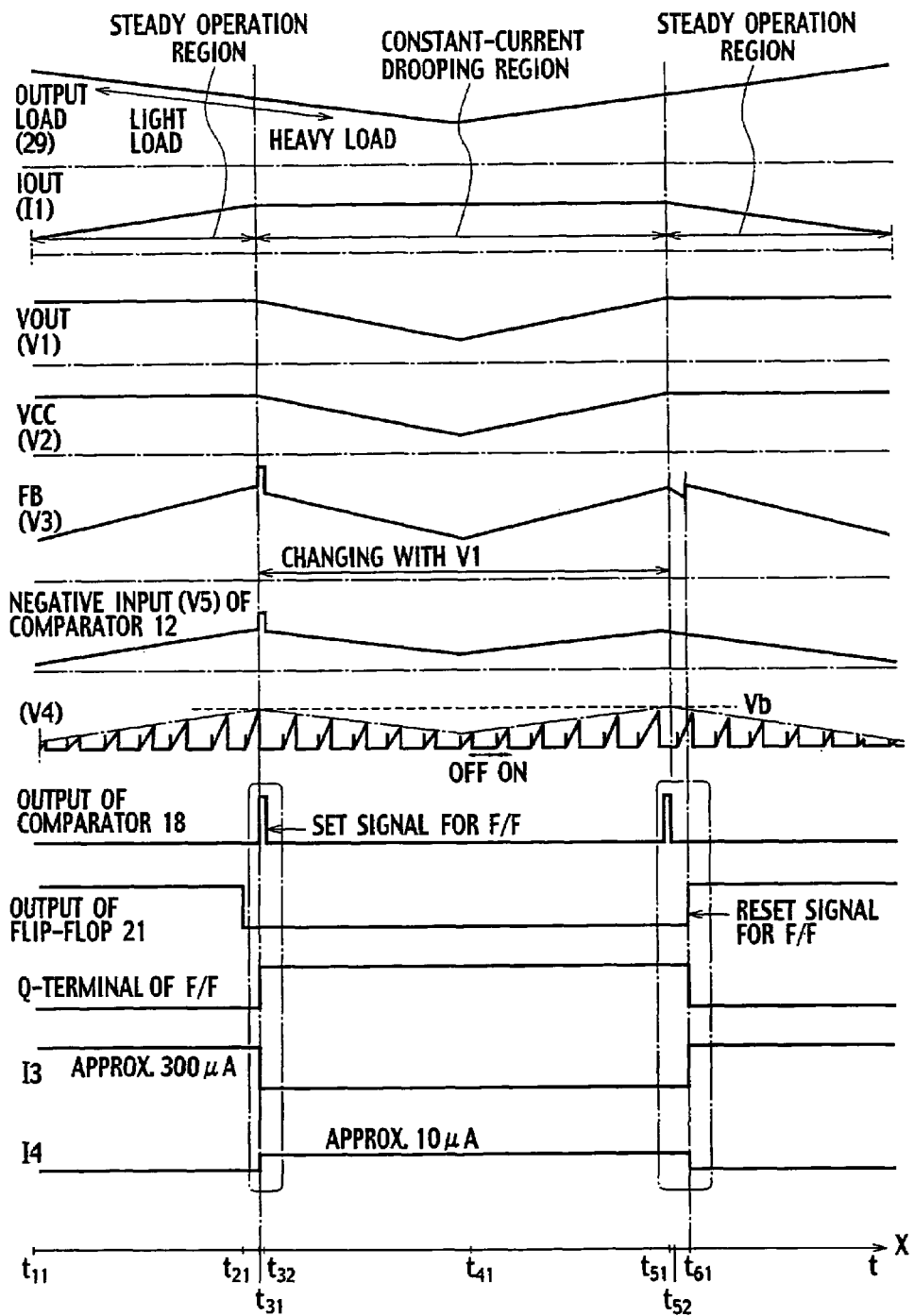
FIG. 5 is a timing chart explaining operation of the switching power source according to the first embodiment of the present invention.

From timing t11 to t31 in a steady operation region, the output load 29 gradually increases from light to heavy, to increase the output current I1. From t11 to t31, the source voltage V4 that is proportional to the drain current I2 of the switching element Q1 is smaller than the reference voltage V6 of the overcurrent detection comparator 18. Accordingly, the output signal of the overcurrent detection comparator 18 is low, and the Q-output terminal of the flip-flop 21 is low. In this case, the switch 22 is in a short state, and the constant current I3 of about 300 µA is superposed on the feedback voltage V3 to gradually increase the feedback voltage V3. During this period, the power source voltage V2 is controlled at a constant voltage as shown in FIG. 5.

When the source voltage V4 proportional to the drain current I2 of the switching element Q1 becomes greater than the reference voltage V6 of the overcurrent detection comparator 18, the output signal of the overcurrent detection comparator 18 changes from low to high at t31. This sets the flip-flop 21, and therefore, the Q-output terminal thereof becomes high.

As a result, at t31, the switch 22 changes from the short state to an open state to disconnect the constant current I3. The feedback voltage V3 is controlled to a voltage divided from the power source voltage V2 by the resistors R21 and R22 and is supplied to the base of the impedance conversion element Q2. At this time, the switch 33 becomes a short state, and a constant current I4 of about 10 µA is superposed on the voltage V5.

(3) Constant-Current Drooping Control

During from t31 to t41, the output load further increases. The output current I1 shows no increase, and the output voltage V1 starts to decrease. As a result, the power source voltage V2 decreases. At this time, the feedback voltage V3 also decreases to gradually narrow the ON-width of the switching element, and the output voltage V1 shows a constant-current drooping characteristic (from Pb to Pc) of FIG. 7.

To make the output voltage V1 achieve the constant-current drooping characteristic, an ideal change in the input voltage V5 to the input terminal in negative polarity (−) of the comparator 12 is as follows:

[Expression 1]

$$V5 = R6 \cdot \{2 \cdot V1 \cdot I1/(\eta \cdot Lp \cdot fosc)\}/2 \quad (1),$$

where η is an energy conversion efficiency, Lp is an inductance of the primary side of the transformer, and fosc is a switching frequency. This forms a curve (a) of FIG. 6 when plotted as a function of the output voltage V1.

Figure 6:
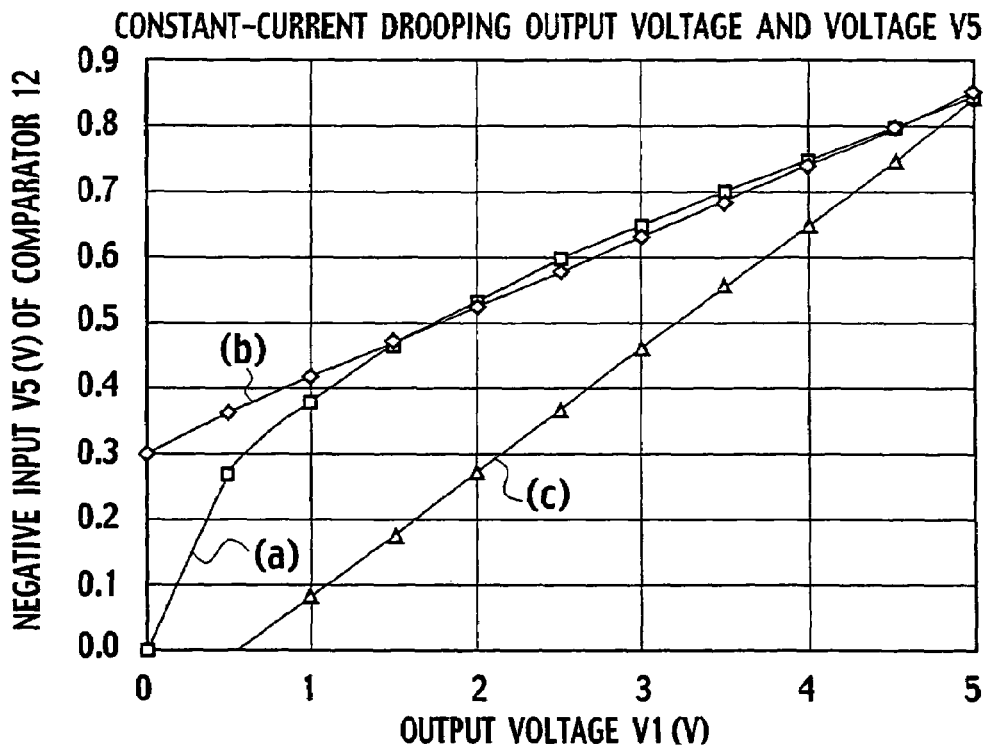
FIG. 6 is a graph showing a relationship between an output voltage V1 and a negative input V5 of a comparator 12.
Figure 7:
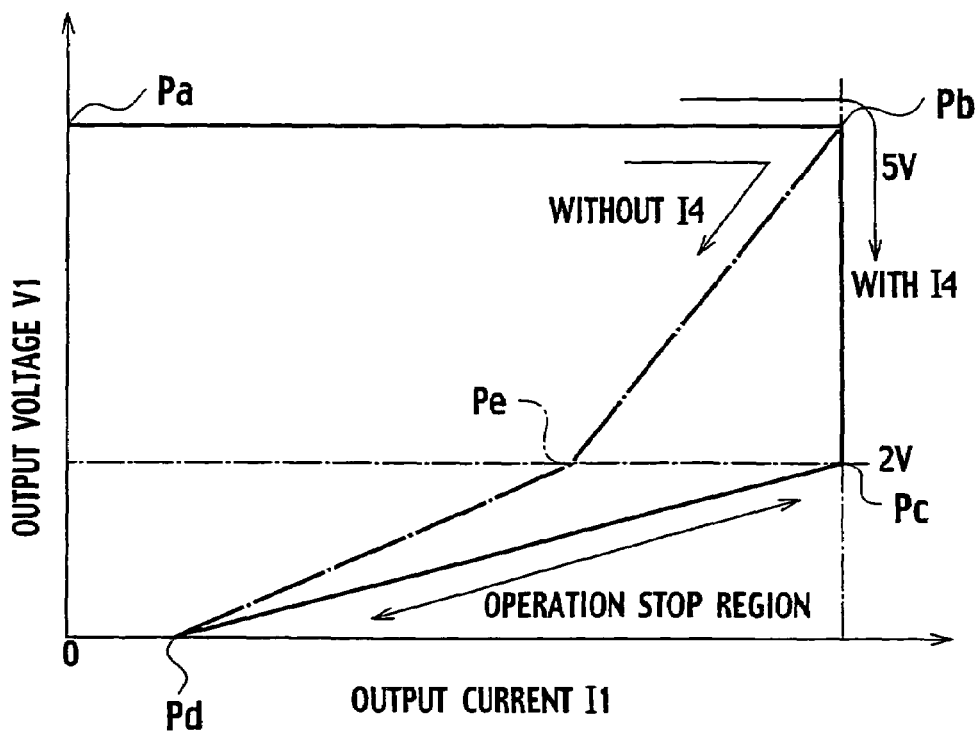
FIG. 7 is a graph showing a relationship between an output current I1 and the output voltage V1.

On the other hand, the semiconductor integrated circuit 8a of the first embodiment shows a substantially ideal voltage change as indicated with a curve (b) of FIG. 6. Accordingly, the first embodiment can carry out constant-current drooping control as indicated with a continuous line (from Pb to Pc) of FIG. 7.

If there is no constant current I4, a sharp change will occur with respect to a change in the output voltage V1, as indicated with a curve (c) of FIG. 6. This corresponds to a dotted line (from Pb to Pe) of FIG. 7, to hardly realize the constant-current drooping characteristic represented with the continuous line.

During from t31 to t41, the output load gradually increases, and therefore, the power source voltage V2 gradually decreases as shown in FIG. 5.

(4) Returning to Steady State

During from t51 to t52, the output load gradually changes from heavy condition to light condition. The power source voltage V2 and feedback voltage V3 increase, the source voltage V4 at the terminals of the drain current detection resistor R6 becomes smaller than the reference voltage V6, and the divided voltage V7 of the power source voltage V2 exceeds the feedback voltage V3. Then, at t61, the switch 22 changes from the open state to a short state, and the switch 33 changes from the short state to an open state, to thereby establish a steady operation state.

In this way, the first embodiment detects whether or not an overcurrent exceeding the reference value V6 is passed to the switching element Q1, switches the first constant current I3 and the second constant current I4 smaller than the first constant current I3 from one to another according to a result of the overcurrent detection, directly superposes the first constant current I3 on the feedback voltage V3 at the input part 6, superposes the second constant current I4 on an output part (the negative polar input terminal (−) of the comparator 12) where the feedback voltage V3 is converted to have an impedance lower than that at the input part 6, and controls the ON-period of a pulse signal supplied to the switching element Q1 according to a resultant feedback voltage, thereby achieving constant-current drooping control on the load.

Second Embodiment

Figure 8:
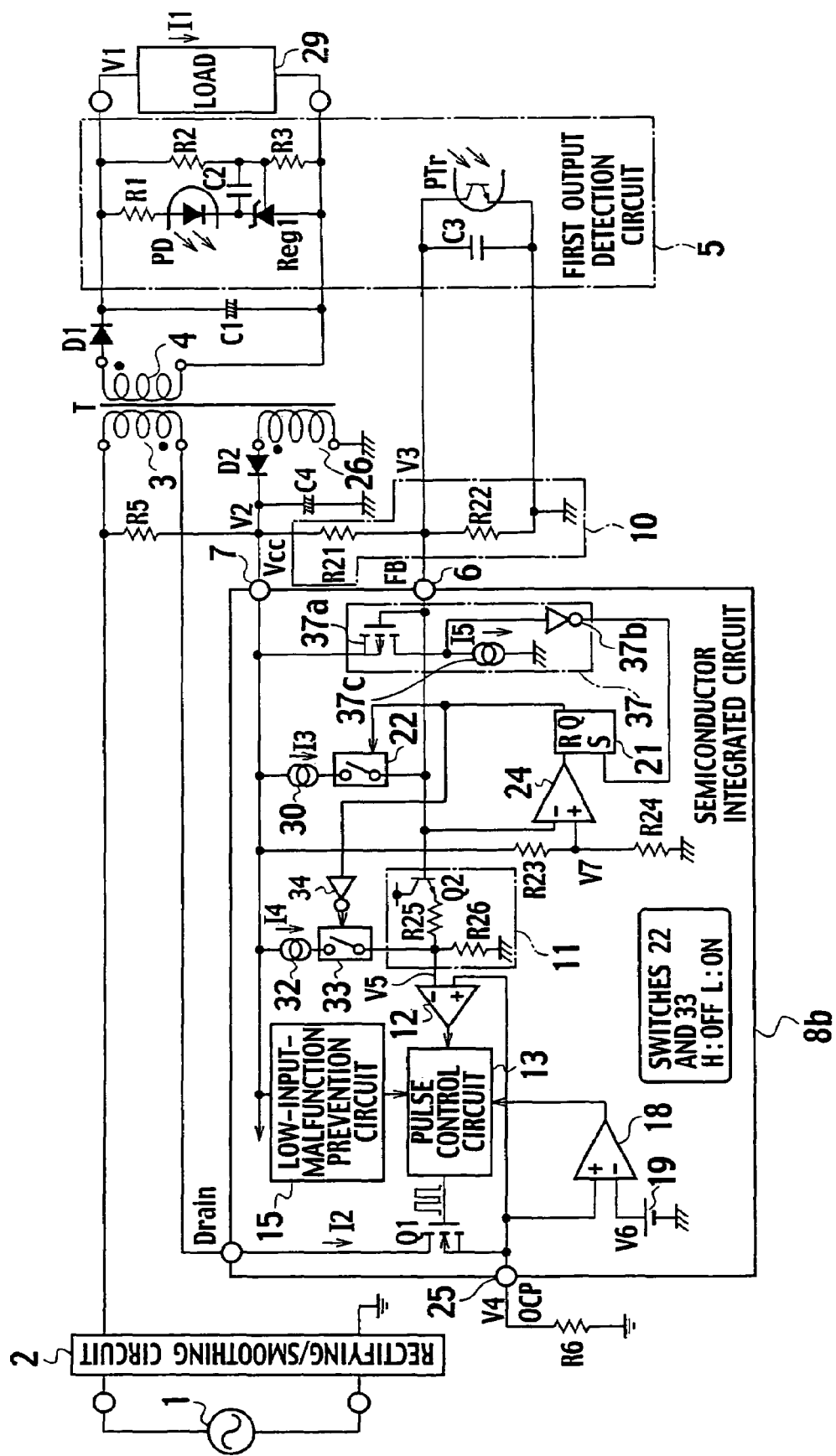
FIG. 8 is a view showing a switching power source according to a second embodiment of the present invention.

FIG. 8 is a view showing the structure of a switching power source according to the second embodiment of the present invention.

Unlike the first embodiment shown in FIG. 4 that directly supplies the output of the overcurrent detection comparator 18 to the set terminal of the flip-flop 21, the second embodiment employs a feedback voltage detection circuit 37 and detects an overload state with the use of a feedback voltage V3.

An input side of the feedback voltage detection circuit 37 is connected to a feedback terminal 6, which is connected to a gate of a MOSFET 37a. A source of the MOSFET 37a is connected to a power source voltage V2, and a drain of the MOSFET 37a is connected to a constant current source 37c. A node between the drain of the MOSFET 37a and the constant current source is connected to an input terminal of an inverter 37b. An output terminal of the inverter 37b is connected to a set terminal of a flip-flop 21.

During from t11 to t31, or in a steady operation region after t51 of FIG. 5, the switching element 37a in the feedback voltage detection circuit 37 is in an ON state, and therefore, the feedback voltage detection circuit 37 provides a low-level output.

During from t31 to t51, as a load current I1 passing through a load 29 increases and a source voltage V4 becomes larger than a reference voltage V6, an overcurrent detection comparator 18 provides a high-level current limit signal to a pulse control circuit 13, to enforce a current limitation.

At this time, feedback control is released, and the feedback voltage V3 increases up to a maximum voltage (power source voltage V2). As a result, the switching element 37a in the feedback voltage detection circuit 37 changes from the ON state to an OFF state, and an output terminal Q of the flip-flop 21 is put in a set state. Thereafter, the same operation as that of the switching power source of the first embodiment takes place.

The switching power source of the first embodiment shown in FIG. 4 instantaneously switches from the steady operation region to the constant-current drooping operation region as soon as an overcurrent is detected. On the other hand, the switching power source of the second embodiment shown in FIG. 8 detects an overcurrent, and then, charges a phase correction capacitor C3 being connected to the feedback terminal 6 and raises the voltage V3 up to the maximum voltage. This takes a certain time and results in decreasing a detection sensitivity and stabilizing operation.

In this way, the second embodiment detects whether or not an overload state is present according to the feedback voltage V3, switches a first constant current I3 and a second constant current I4 smaller than the first constant current I3 from one to another according to a result of the overload detection, superposes the first constant current I3 on the feedback voltage V3 at the input part 6, superposes the second constant current I4 on an output part feedback voltage superpose circuit (a negative polar input terminal (−) of a comparator 12) where the feedback voltage V3 is converted to have an impedance lower than that at the input part 6, and controls the ON-period of a pulse signal supplied to a switching element Q1 according to a resultant feedback voltage, thereby carrying out constant-current drooping control on a load.

Third Embodiment

Figure 9:
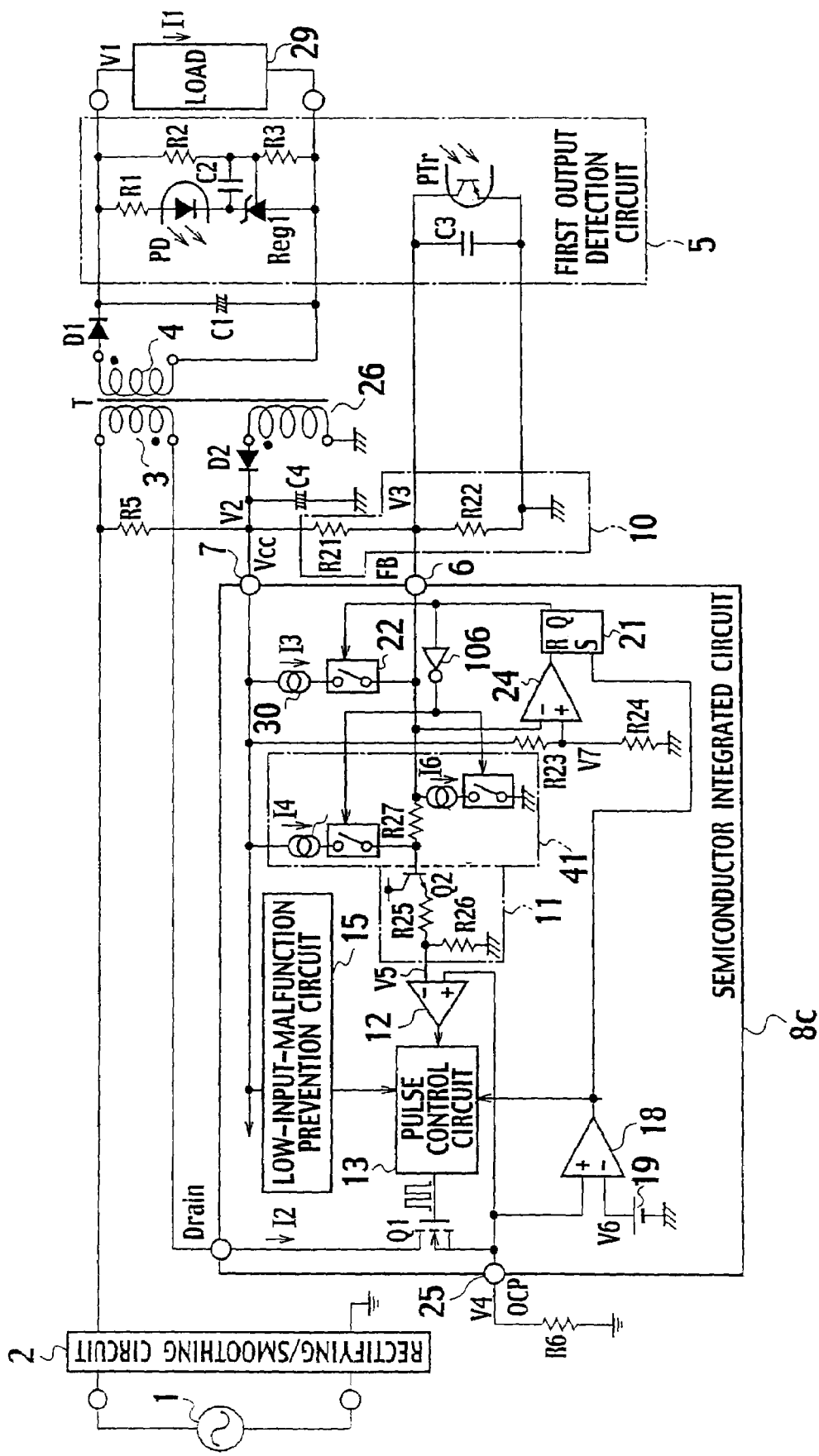
FIG. 9 is a view showing a switching power source according to a third embodiment of the present invention.

FIG. 9 is a view showing the structure of a switching power source according to the third embodiment of the present invention.

Unlike the switching power source of the first embodiment shown in FIG. 4 that determines a minimum value of the voltage V5 according to the constant current 32, the switching power source of the third embodiment shown in FIG. 9 arranges a lower limit voltage set circuit 41 between a feedback terminal 6 and a feedback voltage attenuator 11, to provide a potential difference between the terminals of a resistor R27 and set a lower limit value for the voltage V5.

In this way, the switching power source of the third embodiment detects whether or not an overcurrent exceeding a reference value V6 is passed through a switching element Q1, switches a first constant current I3 to a second constant current I6 and a third constant current I4 that are each smaller than the first constant current I3, or in the other way according to a result of the overcurrent detection, directly superposes the first constant current I3 on a feedback voltage V3 at an input part 6, superposes the second constant current I6 on the feedback voltage V3 at the input part 6, superposes the third constant current I4 on an output part of the resistor R27 connected in series with the input part 6, and controls the ON-period of a pulse signal supplied to the switching element Q1 according to a resultant feedback voltage, thereby achieving constant-current drooping control on a load.

Fourth Embodiment

Figure 10:
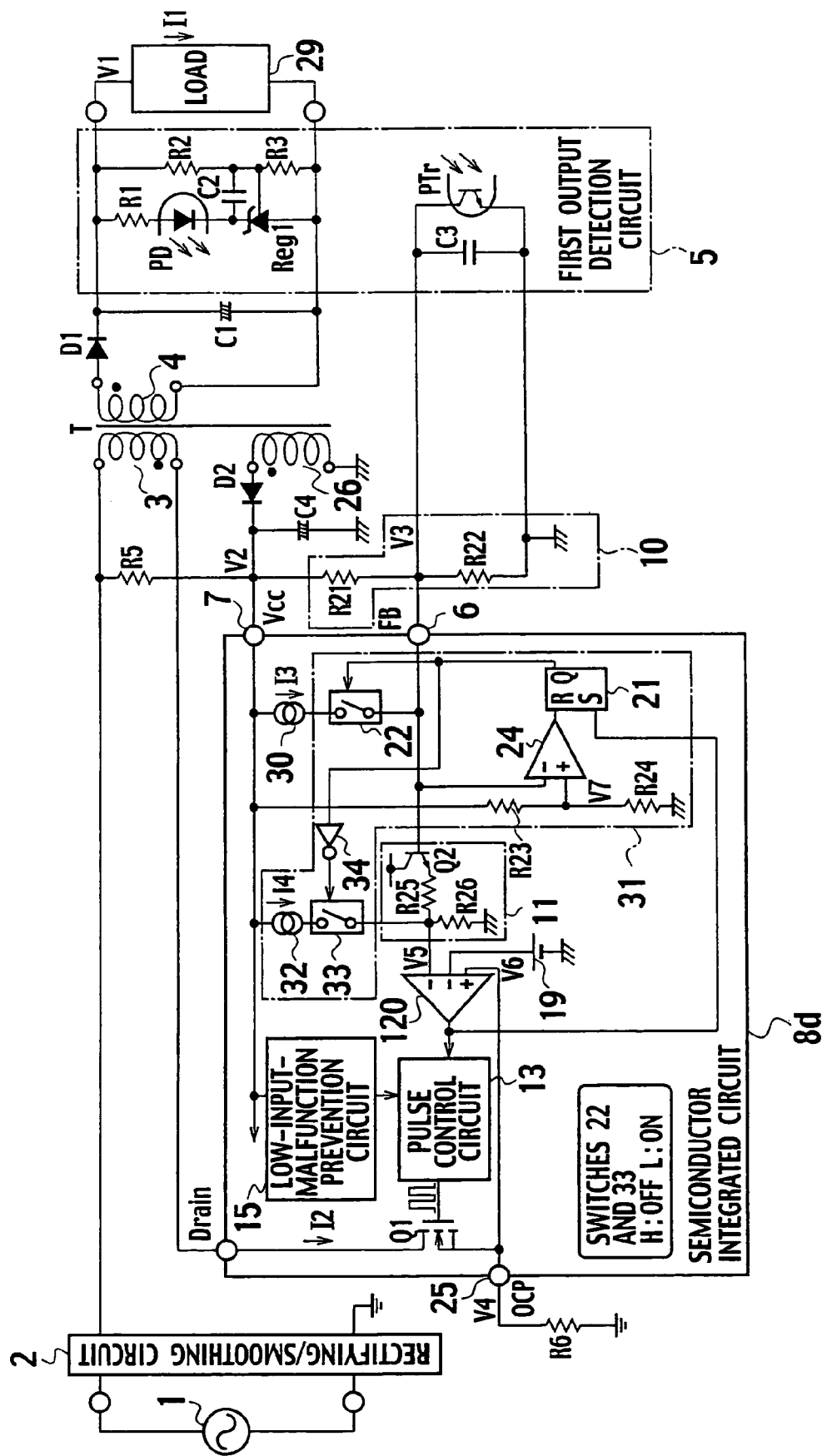
FIG. 10 is a view showing a switching power source according to a fourth embodiment of the present invention.

FIG. 10 is a view showing a switching power source according to the fourth embodiment of the present invention.

In FIG. 10, the switching power source of the fourth embodiment employs a 3-input feedback comparator 120. A reference voltage V6 is supplied to one negative polar input terminal (−) of the comparator 120, to omit the overcurrent detection comparator 18 of the switching power source of the first embodiment shown in FIG. 4.

The embodiments 1 to 4 mentioned above each can achieve the output constant-current drooping control on the primary side of a transformer T without adding terminals to a semiconductor integrated circuit.

Without arranging a current detection circuit on the secondary side of the transformer T like the prior art 1, each embodiment can realize the constant-current drooping characteristic for an output voltage. Accordingly, each embodiment can avoid a loss due to a current detection resistor on the secondary side, improve an energy conversion efficiency, and reduce the cost of the system.

In connection with the related art 2 (Japanese Unexamined Patent Application Publication No. JP9-74748), the present invention can commonly use a power source voltage detection terminal as a feedback terminal, to reduce the number of terminals of a semiconductor integrated circuit. The reduced terminals may be used as heat radiation terminals of the IC, to reduce the thermal resistance of a package and increase output power. With the reduced number of terminals, the present invention is easily applicable to a package such as TO220 that has heat radiation fins and a small number of terminals.

According to the related art 2 (Japanese Unexamined Patent Application Publication No. JP9-74748), the reference voltage V6 of the overcurrent detection comparator is always influenced by the power source voltage V2, to deteriorate an overcurrent detection accuracy. On the other hand, the present invention internally detects an overcurrent with the use of only the reference voltage V6, thereby securing an overcurrent detection accuracy.

INDUSTRIAL APPLICABILITY

The present invention detects whether or not an overcurrent exceeding a reference value is passed to a switching element, switches a first constant current and a second constant current smaller than the first constant current from one to another according to a result of the overcurrent detection, superposes the first constant current on a feedback voltage, superposes the second constant current on an output part where impedance conversion is carried out on the feedback voltage, and controls the ON-period of a pulse signal supplied to the switching element according to a resultant feedback voltage, thereby achieving constant-current drooping control on a load.

The present invention detects whether or not an overload state is present according to a feedback voltage, switches a first constant current and a second constant current smaller than the first constant current from one to another according to a result of the overload detection, superposes the first constant current on the feedback voltage, superposes the second constant current on an output part where impedance conversion is carried out on the feedback voltage, and controls the ON-period of a pulse signal supplied to a switching element according to a resultant feedback voltage, thereby achieving constant-current drooping control on a load.

The present invention detects whether or not an overcurrent exceeding a reference value is passed to a switching element, switches a first constant current to second and third constant currents that are each smaller than the first constant current, or in the other way according to a result of the overcurrent detection, superposes the first and second constant currents on a feedback voltage, superposes the third constant current on an output part of an impedance element connected in series with a feedback voltage superpose circuit, and controls the ON-period of a pulse signal supplied to the switching element according to a resultant feedback voltage, thereby achieving constant-current drooping control on a load.

The invention claimed is:

1. A switching power source comprising:
   a switching element being connected in series with a primary winding of a transformer connected to a DC power source;
   a first rectifying/smoothing circuit configured to rectify and smooth AC power induced by a secondary winding of the transformer;
   a second rectifying/smoothing circuit configured to rectify and smooth AC power induced by an auxiliary winding of the transformer and to provide an internal power source;
   an output detection circuit configured to detect an output voltage that is provided from the first rectifying/smoothing circuit to a load; and
   a control circuit configured to control an ON-period of a pulse signal supplied to the switching element according to a feedback voltage from the output detection circuit, the control circuit including,
      an overcurrent detection circuit configured to detect whether or not an overcurrent exceeding a predetermined reference value is passed through the switching element, and
      a constant-current drooping control circuit configured to select one of a first constant current and a second constant current smaller than the first constant current according to an overcurrent detection result from the overcurrent detection circuit and to superpose a selected current on the feedback voltage from the output detection circuit, wherein
   the control circuit controls the ON-period of the pulse signal supplied to the switching element according to a resultant feedback voltage provided by a feedback voltage superpose circuit.

2. The switching power source according to claim 1, wherein
   the overcurrent detection circuit employs each of the feedback voltage provided by the feedback voltage superpose circuit and a second reference voltage as the predetermined reference value.

3. A switching power source comprising:

a switching element being connected in series with a primary winding of a transformer connected to a DC power source;

a first rectifying/smoothing circuit configured to rectify and smooth AC power induced by a secondary winding of the transformer;

a second rectifying/smoothing circuit configured to rectify and smooth AC power induced by an auxiliary winding of the transformer and to provide an internal power source;

a first output detection circuit configured to detect an output voltage that is provided from the first rectifying/smoothing circuit to a load;

a second output detection circuit configured to detect an output voltage provided from the second rectifying/smoothing circuit; and a control circuit configured to control an ON-period of a pulse signal supplied to the switching element according to a feedback voltage from the first and second output detection circuits, the control circuit including, an overcurrent detection circuit configured to detect whether or not an overcurrent exceeding a predetermined reference value is passed through the switching element, a constant-current drooping control circuit configured to select one of a first constant current and a second constant current smaller than the first constant current according to an overcurrent detection result from the overcurrent detection circuit, output a selected current, and carry out constant-current drooping control, and a feedback voltage superpose circuit configured to superpose the first constant current provided by the constant-current drooping control circuit on the feedback voltage provided by the first and second output detection circuits and to superpose the second constant current on an output of an impedance converter of the feedback voltage, wherein the control circuit controls the ON-period of the pulse signal supplied to the switching element according to a resultant feedback voltage provided by the feedback voltage superpose circuit.

4. The switching power source according to claim 3, wherein the constant-current drooping control circuit changes the second constant current to the first constant current in a case where a voltage divided value of the power source voltage obtained by rectifying and smoothing the AC voltage induced by the auxiliary winding of the transformer exceeds the feedback voltage provided by the first and second output detection circuits.

5. A switching power source comprising:

a switching element being connected in series with a primary winding of a transformer connected to a DC power source;

a first rectifying/smoothing circuit configured to rectify and smooth AC power induced by a secondary winding of the transformer;

a second rectifying/smoothing circuit configured to rectify and smooth AC power induced by an auxiliary winding of the transformer and to provide an internal power source;

a first output detection circuit configured to detect an output voltage that is provided from the first rectifying/smoothing circuit to a load;

a second output detection circuit configured to detect an output voltage provided from the second rectifying/smoothing circuit; and a control circuit configured to control an ON-period of a pulse signal supplied to the switching element according to a feedback voltage from the first and second output detection circuits, the control circuit including, a feedback voltage detection circuit configured to detect whether or not an overload state is present according to the feedback voltage from the output detection circuits, a constant-current drooping control circuit configured to switch a first constant current and a second constant current smaller than the first constant current from one to another according to an overload detection result from the feedback voltage detection circuit and to carry out constant-current drooping control, and a feedback voltage superpose circuit configured to superpose the first constant current provided by the constant-current drooping control circuit on the feedback voltage provided by the first and second output detection circuits and to superpose the second constant current on an output of an impedance converter of the feedback voltage, wherein the control circuit controls the ON-period of the pulse signal supplied to the switching element according to a resultant feedback voltage provided by the feedback voltage superpose circuit.

6. A switching power source comprising:

a switching element being connected in series with a primary winding of a transformer connected to a DC power source;

a first rectifying/smoothing circuit configured to rectify and smooth AC power induced by a secondary winding of the transformer;

a second rectifying/smoothing circuit configured to rectify and smooth AC power induced by an auxiliary winding of the transformer and to provide an internal power source;

a first output detection circuit configured to detect an output voltage that is provided from the first rectifying/smoothing circuit to a load;

a second output detection circuit configured to detect an output voltage provided from the second rectifying/smoothing circuit; and a control circuit configured to control an ON-period of a pulse signal supplied to the switching element according to a feedback voltage from the first and second output detection circuits, the control circuit including, an overcurrent detection circuit configured to detect whether or not an overcurrent exceeding a predetermined reference value is passed through the switching element, a constant-current drooping control circuit configured to switch between a first constant current and second and third constant currents that are each smaller than the first constant current according to an overcurrent detection result from the overcurrent detection circuit and to carry out constant-current drooping control, and a constant-current superpose circuit configured to superpose the first and second constant currents provided by the constant-current drooping control circuit on the feedback voltage provided by the first and second output detection circuits and to superpose the third constant current on an output of an impedance element being connected in series between feedback voltage superpose circuits, wherein the control circuit controls the ON-period of the pulse signal supplied to the switching element according to a resultant feedback voltage provided by a feedback voltage superpose circuits.

7. The switching power source according to claim 6, wherein the constant-current drooping control circuit changes the second and third constant currents to the first constant current in a case where a voltage divided value of the power source voltage obtained by rectifying and smoothing the AC voltage induced by the auxiliary winding of the transformer exceeds the feedback voltage provided by the output detection circuits.

* * * * *